United States Patent [19]

Johnson

[11] 4,240,606
[45] Dec. 23, 1980

[54] FILL VALVE

[75] Inventor: Dwight N. Johnson, El Toro, Calif.

[73] Assignee: JH Industries, Inc., San Marcos, Calif.

[21] Appl. No.: 47,945

[22] Filed: Jun. 12, 1979

Related U.S. Application Data

[62] Division of Ser. No. 809,382, Jun. 23, 1977, Pat. No. 4,180,096.

[51] Int. Cl.³ .............................................. F16K 47/08
[52] U.S. Cl. ..................................... 251/127; 137/436
[58] Field of Search ............................. 137/625.3, 436; 251/127

[56] References Cited

U.S. PATENT DOCUMENTS

| | | | |
|---|---|---|---|
| 352,273 | 11/1886 | Solano | 251/127 |
| 3,495,803 | 2/1970 | Schoepe et al. | |
| 3,559,675 | 2/1971 | Schoepe et al. | |
| 3,894,716 | 7/1975 | Barb | 251/127 |

Primary Examiner—Gerald A. Michalsky
Attorney, Agent, or Firm—Mason, Kolehmainen, Rathburn & Wyss

[57] ABSTRACT

A fill valve for controlling liquid level in a toilet tank or other tank includes a housing with an inlet, an outlet, a valve, and a level sensing mechanism for opening the valve to permit flow when the liquid level is below a predetermined value. A flow impedance path including a compact array of many baffles defining multiple consecutive right angle turns dissipates fluid pressure without substantial velocity increases and consequent cavitation and noise. Stable valve closure when the predetermined level is reached is effected by the mounting and configuration of a valve control lever. The fill valve may be disassembled for service without removal from the tank. A coupling and mounting nut assembly facilitates mounting without tools in a variety of tanks. A backflow preventer including few simple parts may be incorporated to provide redundant cross-connection protection.

2 Claims, 13 Drawing Figures

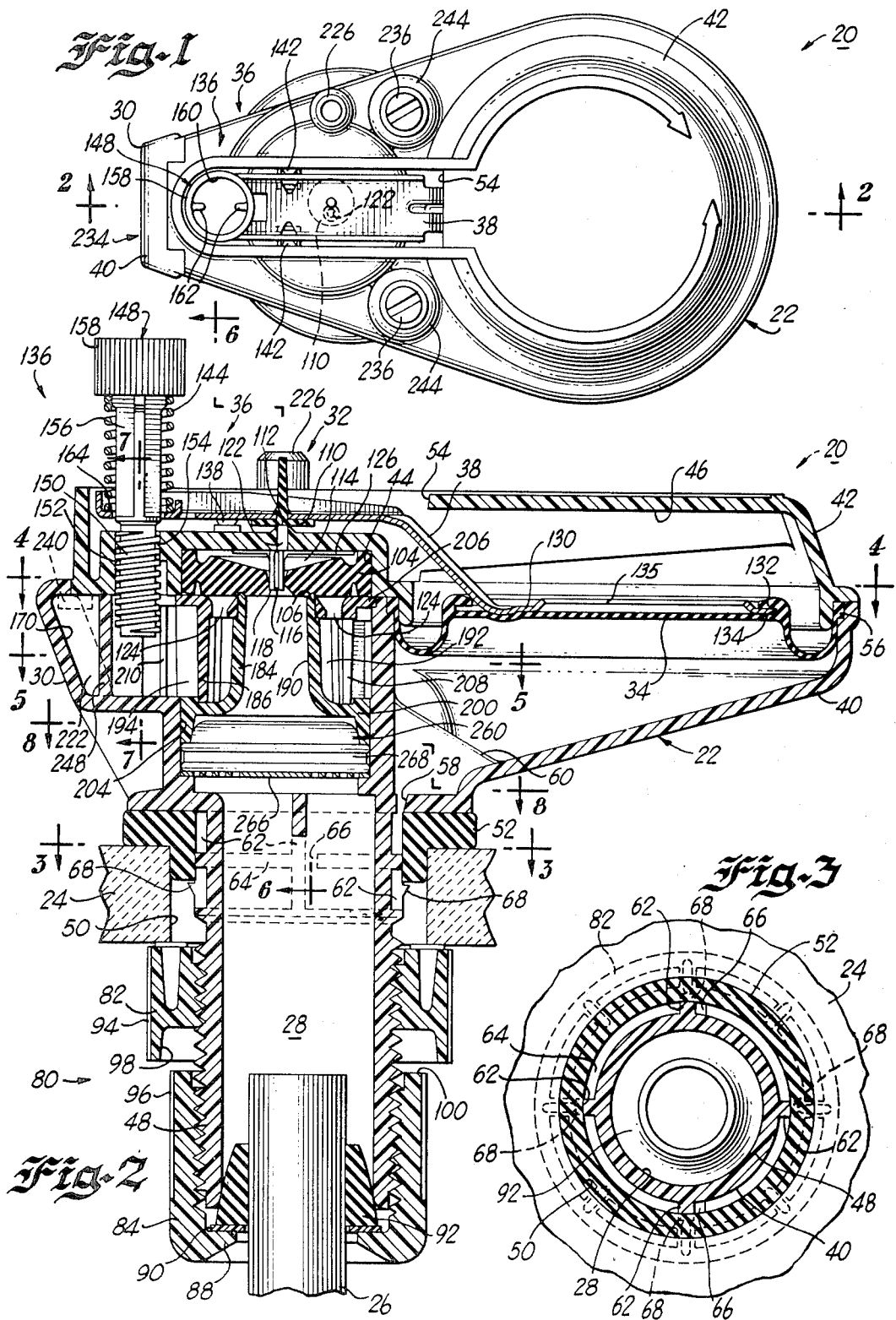

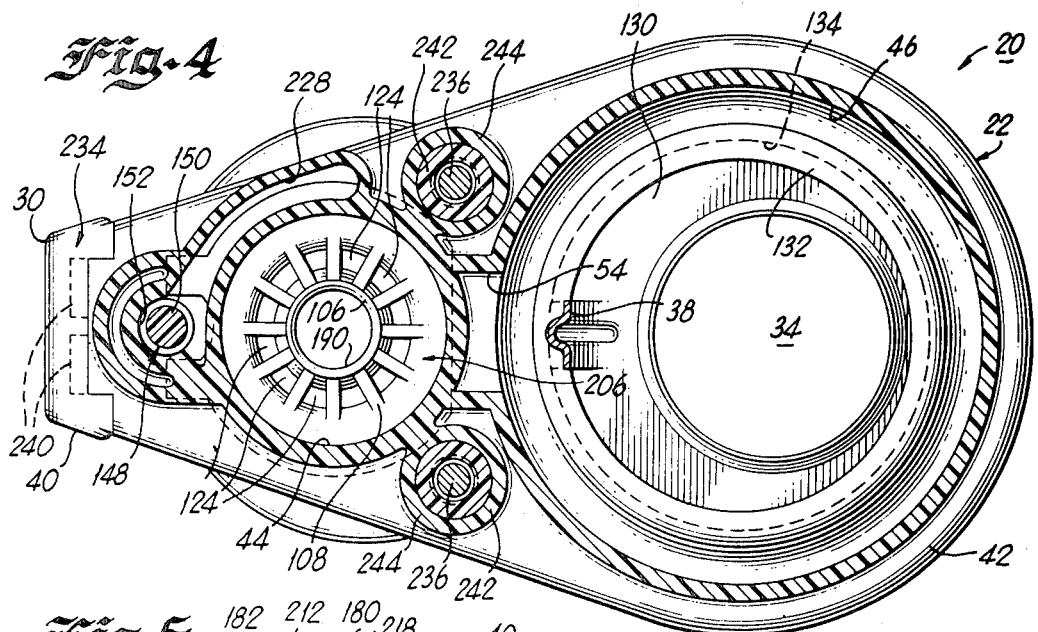
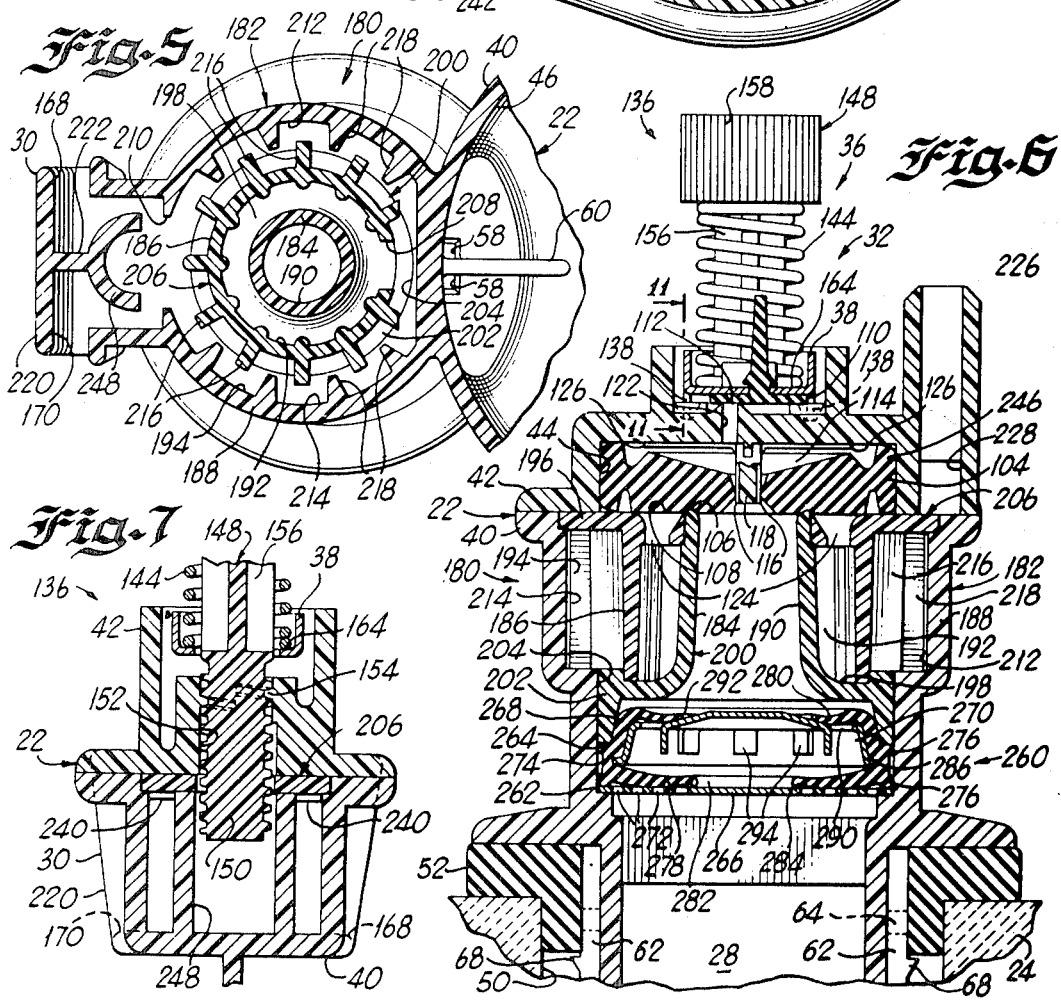

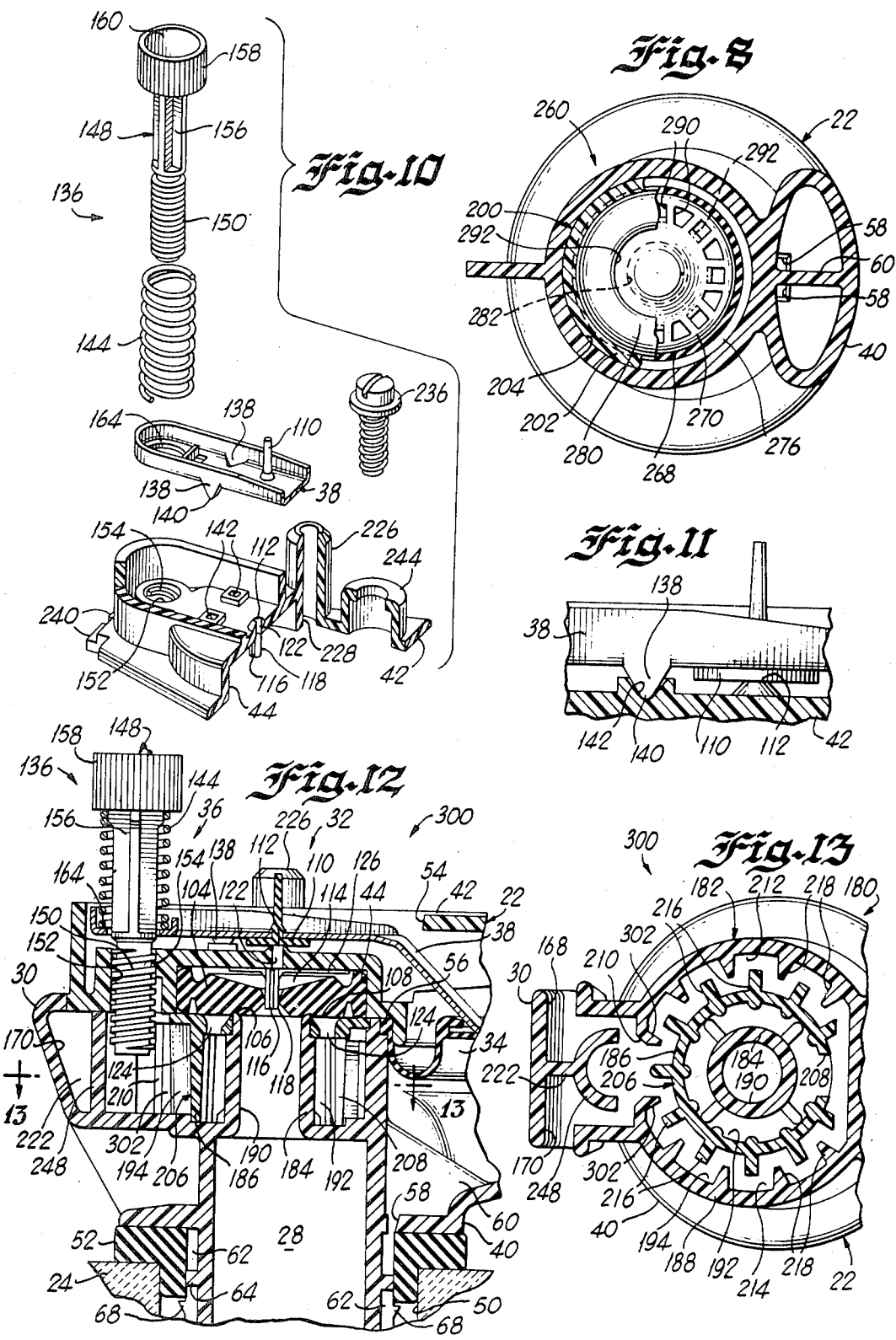

FILL VALVE

This is a division of application Ser. No. 809,382, filed June 23, 1977, now U.S. Pat. No. 4,180,096.

The present invention relates to improvements in fill valves for controlling liquid level in a tank such as a toilet tank.

Fill valves function to maintain a predetermined liquid level in a tank or reservoir, and are used widely in toilet tanks and other tanks. A typical fill valve includes an inlet adapted to be connected to a liquid supply, an outlet communicating with the tank, a valve for permitting or preventing flow from the inlet to the outlet, a device for detecting the level of liquid in the tank, and a control assembly coupled between the detecting device and the valve for opening the valve when the liquid level is below a predetermined level.

In the past, the most widely used fill valve has been a ball cock wherein the valve is controlled by a float. My U.S. Pat. No. 3,895,645 granted July 22, 1975 discloses a fill valve which is substantially more compact and less expensive to manufacture then a ball cock. The fill valve disclosed in that patent is entirely submerged and utilizes a diaphragm responsive to liquid pressure to detect liquid level.

While the device disclosed in the above noted U.S. Pat. No. 3,895,645 has been successful in fulfilling its intended purposes, the present invention relates to improvements in fill valves of that type. In addition, the improvements to which the present invention relates can be applied to other types of fill valves including float controlled valves such as ball cocks.

Among the more generaly objects of the present invention are to provide an improved fill valve which is compact in size, reliable in operation, inexpensive to manufacture, and easy to install; to provide improvements in a fill valve of the type disclosed in my U.S. Pat. No. 3,895,645; and to provide improvements in fill valves capable of overcoming disadvantages experienced in the past in known fill valves and similar devices.

Fluid flowing through a fill valve from a liquid source such as a pressurized water supply to an unpressurized tank experiences a substantial drop in pressure. Moreover, in many situations it is necessary or desirable to restrict inlet flow velocity; for example, in a toilet tank the fill rate should be restricted in order to avoid a possible overflow condition. In known fill valves, flow is restricted by one or a few restricted passages or orifices along the flow path wherein fluid pressure is dissipated. This results in local velocity increases causing difficulties such as cavitation and noise.

It has been recognized that pressure may be dissipated and velocity attenuated through the use of a multiplicity of consecutive right angle flow path turns. This approach for example has been employed in large industrial velocity control elements for liquid and gas pipelines and the like. However, this approach has not been successfully utilized in a small device such as a fill valve due to the difficulty of providing a sufficiently compact flow path incorporating multiple right angle turns.

It is an object of the present invention to provide an improved fill valve having a novel flow impedance means for dissipating pressure and reducing flow while avoiding problems such as cavitation and noise attendant upon substantial localized velocity increases. Another object is to provide a flow impedance means for a fill valve in a compact arrangement avoiding the necessity for a bulky or complex housing.

In many types of fill valves including that disclosed in my U.S. Pat. No. 3,895,645, a control lever is used to operate the valve in response to movement of a diaphragm or other level detecting device. A predetermined liquid level may be established by the application to the lever of a reference force typically provided by a spring. Difficulties can be encountered with this arrangement in effecting consistent and stable valve closure at the predetermined level. Such difficulties can arise from factors such as friction and mechanical instability. In addition, difficulties can arise from changes in effective lever arm length such that the reference force applied to the lever does not achieve reliable valve closure.

It is an object of the present invention to provide a novel fill valve control arrangement coupled between a level detecting device and a valve for effecting stable valve operation. Another object is to provide a level configuration and mounting permitting precise and reliable positioning of the valve and avoiding problems of friction. Another object is to provide a lever configuration and mounting characterized by application of a reference spring force in such a way that consistent valve closure is obtained.

Fill valves used in tank filling operations are subject to wear as well as to contaminants or particles which may be present in the supply of water or other liquid. Consequently, it is desirable that provision be made for servicing and repair. In some known fill valves including that disclosed in my U.S. Pat. No. 3,895,645, disassembly of the fill valve without removal from the tank is not possible.

Accordingly, it is an object of the present invention to provide improvements in fill valves making possible disassembly of the valve while the valve remains mounted in a tank. It is another object to permit the separation of portions of the housing of a fill valve to permit access to internal components of the valve without disturbing the mounting of the valve and without altering the adjustment of the valve.

It is desirable that a fill valve be capable of being installed in a wide variety of tanks. For example, toilet tanks may differ in wall thickness and in the configuration of the existing water supply pipe adjacent the tank inlet opening. When the fill valve is mounted with a mounting nut and coupled to the supply conduit with a coupling assembly including a coupling nut, it is desirable that this be accomplished by hand rather than with the use of tools which could damage the tank or the valve.

Among the objects of the present invention are to provide an improved mounting and coupling nut assembly for attaching a fill valve to a tank; to provide a mounting and coupling nut assembly capable of accomplishing fill valve mounting without tools; and to provide a mounting and coupling nut assembly rendering a fill valve adaptable to a substantial range of tank wall thicknesses and inlet pipe configurations.

The fill valve of the present invention prevents backflow or siphonage from the tank to the supply conduit. However, in order to provide redundant protection and to provide a fill valve having additional backflow protection, it may be desirable to provide the fill valve with a backflow preventer or antisiphon device. Moreover, such a device may have wide application not only to fill valves of various types but also to other devices or fixtures connected to a water system.

It is an important object of the present invention to provide an improved backflow preventer. Other objects are to provide a backflow preventer having a small number of inexpensive, easily fabricated, and easily assembled parts; to provide a backflow preventer in the form of a module adaptable to different installations and fixtures; and to provide a backflow preventer capable of performing a straining function.

In brief, the objects and advantages of the present invention including those discussed above are achieved through the provision of a fill valve including a housing positioned within a tank and having an inlet and an outlet. A valve is movable between open and closed positions to permit and prevent flow into the tank. A sensing device detects the level of liquid in the tank and a control assembly coupled between the sensing device and the valve opens the valve if the liquid level is below the predetermined level.

In accordance with an important feature of the invention, there is provided a flow impedance means in the liquid flow path for dissipating fluid pressure and regulating flow rate along the flow path while minimizing fluid velocity increases, noise and cavitation. The impedance means in accordance with the invention takes the form of a flow path including a multiplicity of consecutive right angle turns.

In accordance with a further feature of the invention, the control assembly coupled between the liquid level control device and the valve includes a lever pivoted at one point along its length and to which a spring biasing force is applied in the valve opening direction at another point. The lever is shaped and mounted so that the spring force application direction approaches perpendicular to the line between the pivot point and the spring force application point as the valve opens.

In accordance with another aspect of the present invention, the valve housing includes a body and a cover between which are supported the valve and the level detecting device in the form of a diaphragm. The valve control assembly including the lever is supported on the cover, and at least one fastener accessible from above the housing holds the cover and the body is assembled relation. The reference biasing spring is supported only by the cover so that the housing may be disassembled for access to interior components without removing the body from its installed position in the tank and without disturbing the spring force adjustment.

A further feature of the prevent invention relates to the provision of a novel backflow preventer adapted to be installed in the fill valve inlet or other liquid conduit between a pair of interfacing shoulders. The backflow preventer includes a disc abutting the upstream shoulder and an elastomeric body including an annular ring portion and two inwardly extending check valve portions having central openings. The upstream check valve portion overlies upstream flow passages in the disc, and a cup member is received between the upstream and downstream check valve portions and includes downstream flow passages controlled by the downstream check valve portion. The upstream passages can perform a straining function, and projections formed simultaneously with the downstream flow passages prevent the upstream check valve portion from closing the downstream flow passages.

The above and other objects and advantages of the invention may be best understood from the following detailed description of the embodiments of the present invention illustrated in the drawings, wherein:

FIG. 1 is a top view of a fill valve embodying the features of the present invention;

FIG. 2 is a vertical sectional view on an enlarged scale taken along the line 2—2 of FIG. 1;

FIG. 3 is a sectional view taken along the line 3—3 of FIG. 2;

FIG. 4 is a sectional view taken along the line 4—4 of FIG. 2;

FIG. 5 is a fragmentary sectional view taken along the line 5—5 of FIG. 2;

FIG. 6 is a fragmentary sectional view on an enlarged scale taken along the line 6—6 of FIG. 2;

FIG. 7 is a fragmentary sectional view on an enlarged scale taken along the line 7—7 of FIG. 2;

FIG. 8 is a sectional view on an enlarged scale taken along the line 8—8 of FIG. 2;

FIG. 10 is a fragmentary exploded perspective view of components of the fill valve of FIG. 1.

FIG. 11 is a greatly enlarged fragmentary sectional view taken along the line 11—11 of FIG. 6;

FIG. 12 is a sectional view similar to part of FIG. 2 illustrating an alternative embodiment of the invention; and FIG. 13 is a sectional view taken along the line 13—13 of FIG. 12.

Figure 9:
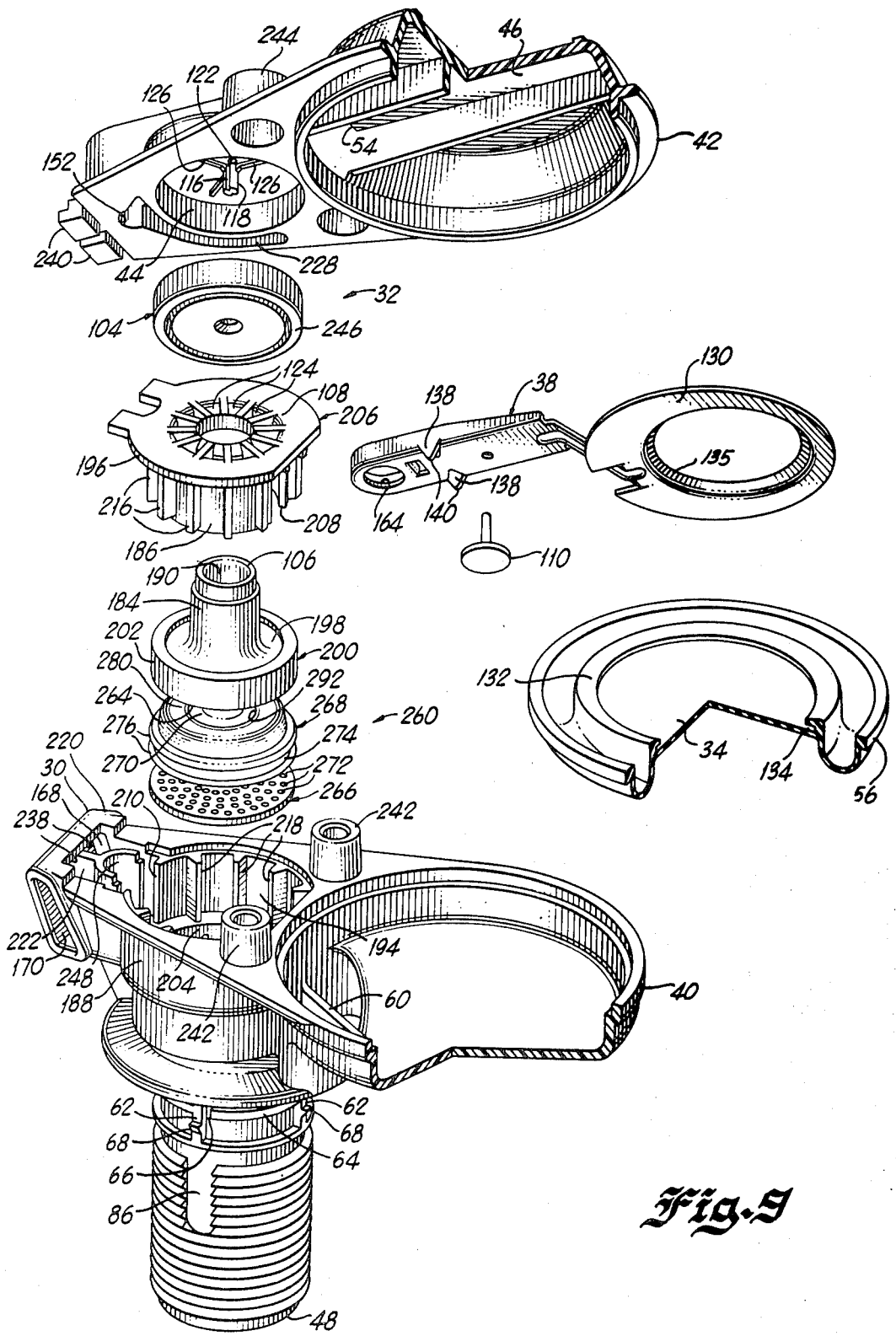
FIG. 9 is an exploded perspective view of components of the fill valve of FIG. 1, with some components shown in partial section.

With reference now to FIGS. 1-11 of the accompanying drawings, there is illustrated a fill valve constructed in accordance with the principles of the present invention and designated as a whole by the reference numeral 20. The fill valve 20 includes a housing generally designated as 22 adapted to be mounted to the wall 24 of a tank such as a toilet tank of which a fragment is shown in FIGS. 2, 3, 6 and 12. The valve is supplied with liquid from a water supply or other liquid conduit 26 (FIGS. 2 and 3) and maintains the liquid within the tank at a selected predetermined level.

In some respects, the fill valve 20 is similar to that disclosed in U.S. Pat. No. 3,895,645 granted on July 22, 1975. The entire disclosure of that patent is incorporated herein by reference.

In general, the fill valve 20 includes an inlet 28 communicating with the supply conduit 26, an outlet 30 communicating with the interior of the tank, and a valve assembly generally designated as 32 disposed in the flow path between the inlet and the outlet. A diaphragm 34 detects level changes of the liquid within the tank and a control assembly 36 including a control lever 38 operates the valve assembly 32 in response to diaphragm movement in order to open the valve assembly when the liquid level is below the predetermined level and to close the valve assembly when the liquid level reaches the predetermined level.

Proceeding now to a more detailed description of the structure and operation of the fill valve 20, the housing 22 includes a body or main portion 40 and a cover 42 defining therebetween a valve chamber 44 and a diaphragm chamber 46. The body 40 includes a projecting shank portion 48 extending through an opening 50 in the tank wall 24. A gasket 52 is held in sealing relation between the body 40 and the tank wall 24 at the opening 50 to prevent leakage of fluid from the tank.

Diaphragm chamber 46 is communicated to fluid pressure with the tank by means of an opening 54 in the cover 42. The diaphragm 34 includes a lip 56 held in sealing relation between the body 40 and the cover 42, and the upper surface of the diaphragm is exposed to fluid pressure so that the diaphragm moves downward as liquid level increases.

In order to provide compensation for atmospheric pressure changes, the underside of the diphragm 34 is communicated with the exterior of the tank. More specifically, the lowermost portion of the diaphragm chamber 46 communicates with a pair of openings 58 separated by a rib or web 60 and leading to the projecting shank 48. In the region of the gasket 52, the shank 48 includes a number of axially extending ribs 62 and an annular rib 64 to assure clearance for the passage of air within the gasket 52. As can be seen in FIG. 3, annular rib 64 is interrupted by a pair of notches 66 for pressure communication across the rib 64. Ribs 62 are provided with projections or barbs 68 for retaining the gasket 52 in assembly, and the region below the gasket 52 communicates with the exterior of the tank through the tank opening 50.

In accordance with one feature of the present invention, there is provided a mounting and coupling nut assembly generally designated by the reference numeral 80 (FIG. 2) for mounting the fill valve 20 to the tank wall 24 and for coupling the inlet 28 to the supply conduit 26. The assembly 80 is capable of assembly without the use of tools, and accommodates tank walls of a wide range of thickness, yet is a compact assembly adaptable to various inlet pipe configurations.

More specifically, the mounting and coupling nut assembly 80 includes a mounting nut 82 and a coupling nut 84 each having internal threads and received on external threads provided on projecting shank portion 48 within which is located the fill valve inlet 28. The mounting nut 82 is threaded first onto the projection 48 until its innermost end engages the tank wall 24 in order to mount the fill valve 20 in position and to effect a seal between the body 40 and the tank wall 24 with the gasket 52. The nut 82 is provided with a number of spaced apart projections 86 permitting air flow between the projections and completing the path for venting to atmosphere of the portion of diaphragm chamber 46 beneath the diaphragm 34. A parallel flow path is defined by a groove or notch 86 (FIG. 9) in the threads of the projection 48 so that venting is accomplished reliably even if one or the other of the parallel paths is blocked through the improper use of pipe joining compound or otherwise.

Coupling nut 84 is threaded onto projection 48 after installation of the mounting nut 82, and includes a flanged end 88 which functions through the agency of a washer 90 to deform a cone washer 92 into sealing engagement between the supply conduit 26 and the outermost end of projection 48.

It is an important advantage of the mounting and coupling nut assembly 80 that both nuts 82 and 84 can be hand tightened without the use of wrenches or other tools. Hand tightening is facilitated by providing serrations 94 and 96 on circular outer peripheries of the nuts 82 and 84. Hand tightening of the nuts 82 and 84 prevents possible damage to the tank wall 24 and/or the fill valve 20 upon installation, and renders installation of the fill valve 20 convenient, particularly when the fill valve 20 is installed by a homeowner rather than by a tradesman.

In order to permit hand tightening of the mounting nut 82, its axial length must be substantial in order to permit grasping by the fingers of the installer. While a nut intended to be tightened with a wrench could be substantially thinner, for hand tightening it is desirable that the mounting nut have an axial length at least equal to approximately half of the axial length of the coupling nut 84 which is of standard conventional size. The necessity for a mounting nut of substantial axial length would result in an undesirable axial length of the entire mounting and coupling nut assembly were normal nut configurations to be utilized.

In addition, it is desirable that the fill valve 20 be capable of mounting it tanks having tank walls of substantial thickness. In order to accommodate a wall of substantial thickness and to permit mounting of conventional mounting and coupling nuts, the projection or shank 48 would have to be of substantial axial length. Difficulties can be encountered with a projection of great length because this would increase the overall size of the fill valve, and because in some installations the projection could interfere with a bend or other obstruction along the supply conduit 26 adjacent the tank wall.

In accordance with the present invention, the mounting and coupling nut assembly 80 provides an extremely compact arrangement permitting substantial axial length of the mounting nut 82 and accommodating thick tank walls without a large overall length of the projection 48 and the assembly 80. As can be seen in FIG. 2, the mounting nut 82 includes a circular cross-section substantially larger in diameter than the complementary circular cross-section of the coupling nut 84. Moreover, the outermost wall of the nut 82 is provided with an annular recess 98 into which the innermost end 100 of the coupling nut 84 may be received. This permits the nuts to be overlapped or telescoped one within the other so that with a thick tank wall, the axial distance required by the nuts 82 and 84 is less than the sum of their individual lengths.

Control of liquid flow from the inlet 28 to the outlet 30 of the fill valve 20 is effected by the valve assembly 32 under the control of the control assembly 36 and lever 38. Valve assembly 32 includes a main valve member 104 cooperating with a valve seat 106 and a valving surface 108, together with a pilot valve member 110 carried by the lever 38 and cooperating with a pilot valve seat 112.

In the closed position of the valve assembly 32 illustrated in the drawings, the pilot valve member 110 contacts the pilot valve seat 112 to prevent communication between the interior of the tank and a valve control chamber 114 immediately above the main valve member 104. The region within and below the valve seat 106 is exposed to inlet pressure, which pressure is communicated to chamber 114 by means of bleed passages or grooves 116 in a projection 118 in wiping contact with a central opening in the valve member 104. Because the underside of the main valve member 104 radially outside of the valve seat 106 is at tank or outlet pressure, the main valve member is biased closed by the inlet pressure in the control chamber 114.

When liquid level in the tank drops below the predetermined level, resulting movement of lever 38 moves the pilot valve member 110 away from the pilot valve seat 112. Pressure within the control chamber 114 drops due to interconnection of the chamber with tank by way of a passage 122 having a larger cross-sectional area than the bleed passages 116 and surrounded by the pilot valve seat 112. As control chamber pressure drops, the inlet pressure within valve seat 106 causes the main valve member 104 to move upwardly away from the valve seat 106 and surface 108. A rolling or peeling action is achieved by the provision of a number of generally triangular ports 124 in the valving surface 108.

When the valve assembly 32 is in its open condition, fluid flows from the inlet 28, through the valve seat 106, radially outward over the valving surface 108, and through the ports 124 toward the outlet 30. In the open position of valve member 104, its upper surface engages ridges or projections 126 formed within the valve chamber 44 on the cover 42, assuring that pressure within the control chamber 114 is communicated over the upper surface of the valve member 104.

When the predetermined liquid level is attained by flow through the fill valve 20, the pilot valve member 110 engages the pilot valve seat 112 to close the passage 122. Consequently, pressure within the control chamber 114 again rises as inlet pressure communicates through bleed passages 116. The main valve member 104 is returned to its illustrated, closed position by the increased pressure in control chamber 114.

Movement of the diaphragm 34 in response to liquid level changes is utilized to operate the valve assembly 32 between closed and open positions through the agency of the control assembly 36 and control lever 38. As best illustrated in FIGS. 4 and 9, within the diaphragm chamber 46 the lever 38 terminates in a generally planar circular portion 130 received in a slot 132 formed by a lip 134 of the diaphragm 34. As a result, upward and downward movement of the diaphragm 34 results in upward or downward movement of the end portion 130 of the lever 38. The end portion 130 of the lever 38 is provided with a central aperture 136 permitting deflection of the central portion of the diaphragm 34 when pressurized.

In accordance with an important feature of the invention, the lever 38 is shaped and mounted to provide stable closing of the valve assembly 32 when the predetermined liquid level is reached. This important result is attained by the way in which the lever is mounted for pivoting movement and by the positioning relative to the lever of a reference biasing structure generally designated by the reference numeral 136.

More specifically, and as best seen in FIGS. 9-11, lever 38 includes a pair of pivot projections 138 terminating in points 140 (FIG. 11). Cover 42 is provided with a pair of sockets 142 complementary in shape to the projections 138 and within which points 140 are pivotally received. Points 140 thus define the pivot point about which lever 38 pivots. This arrangement provides for pivoting of the lever 38 with a minimum of friction, and captures the lever 38 in a precisely determined position from which it cannot stray during handling, installation or operation. As a result, problems due to interference or friction of the lever moving against portions of the cover or other structure arising from unintentional displacement of the lever are avoided. Moreover, the lever arm distances along the lever 38 are reliably and exactly determined since the pivot point is precisely located on the lever. In particular, the relatively short lever arm distance between the pivot point 140 and the reference biasing structure is precisely determined and fixed.

The reference biasing structure 136 includes a biasing spring 144 held in compression against the lever 38 opposite the diaphragm engaging end 130. Liquid pressure acting upon diaphragm 34 tends to pivot the lever 38 in the clockwise, valve-closing direction as viewed in FIG. 2 around the pivot point 140, and the spring 144 tends to pivot the lever 38 in the counterclockwise, valve-opening direction. Thus, the spring 144 provides a reference biasing force establishing the predetermined liquid level at which the pilot valve member 110 closes the seat 112 thereby to operate the valve assembly 32 to the closed position.

In order to support and permit adjustment of the spring 144, there is provided an adjusting screw 148 preferably formed of molded plastic and having a threaded portion 150 received in an opening 152 in the cover 42. An easily manufactured configuration is achieved by providing the opening 152 with only a single thread convolution 154 (FIG. 7) which can be molded without machining or complex coring.

Adjusting screw 148 includes a shank portion 156 around which the spring 144 is received, together with a head 158 under which the spring is captured. The head 158 is provided with serrations so that it can be easily turned by hand. Moreover, a recess 160 in the head includes radially inwardly directed projections 162 so that the adjusting screw can be rotated with a screwdriver or other tool if it is desired to effect an adjustment without reaching into liquid within the tank.

The spring 144 applies a valve-opening force to the lever 38 at a force application point or region designated as 164 spaced by an effective lever arm distance from the pivot point 140. The reference spring force is applied vertically as illustrated in FIG. 2 to the force application point 164, and in the valve closed position illustrated in the drawings, the point 164 is substantially above the pivot point 140, i.e., in the illustrated configuration the effective lever arm or line between the points 140 and 164 is not horizontal. Consequently, in the valve closed position, the reference force direction forms a nonperpendicular angle to a line extending between the pivot point and the force application point.

As the lever 38 moves to the valve open position by pivoting about the pivot point 140, the force application point 164 moves relatively downward toward an orientation wherein the reference spring force is perpendicular to a line between the pivot point and the force application point; i.e., the effective lever arm or line between points 140 and 164 approaches horizontal. In this perpendicular orientation, the effective spring force is maximized since it acts normal to the effective lever arm. During movement from the open to the closed position, the effective spring force relatively decreases because, as the angle between the force application direction and the effective lever arm moves further from perpendicular, the component of the spring force normal to the effective lever arm relatively decreases.

An important advantage of this arrangement is that stable and accurate valve closure occurs when the predetermined liquid level is attained. As the predetermined level is approached, the lever nears the valve closed position. During this movement the effective reference spring biasing force applied in the valve opening direction relatively decreases. This provides what might be termed a self-reinforcing closing action.

In order to augment this desirable closing action, the outlet 30 is arranged to create turbulence in the region of the fill valve 20 in order to reduce the pressure sensed by diaphragm 34 while filling is occurring. More specifically, with reference to FIGS. 2 and 5, it can be seen that outlet 30 comprises a pair of outlet ports 168 and 170 discharging fluid generally horizontally as viewed in the drawings, and in opposite directions. Discharged fluid in the plane of the fill valve 20 creates turbulence in the region of the fill valve and in the region of the opening 54 leading to the diaphragm chamber 46. As a result, during filling, the diaphragm 34 experiences a pressure somewhat less than would occur in the absence of turbulence. As the lever 38 approaches the valve closed position, the valve assembly 32 begins to close and to decrease flow through the outlet ports 168 and 170. As a result, turbulence decreases and the diaphragm 34 experiences not only the increased pressure dut to increasing liquid level, but also an increase in sensed pressure due to the reduction in turbulence.

In combination, the decrease in the effective valve-opening spring force acting in concert with the increase in sensed pressure due to decreasing turbulence serves to provide a stable and reliable shutoff of the valve assembly 32 at a consistent liquid level.

In accordance with an important feature of the invention, there is provided a flow impedance arrangement generally designated as 180 in the flow path between the inlet 28 and outlet 30 of the fill valve 20. The flow impedance arrangement 180 serves to limit flow velocity through the fill valve 20 to a desired rate, while dissipating fluid inlet pressure without the excessive localized velocity, cavitation and noise inherent in devices using small area flow restrictions. Rather, as appears below, the flow impedance arrangement 180 incorporates relatively large area passages wherein localized velocity increases do not occur. These passages include structure defining a multiplicity of consecutive right angle turns in the flow path necessitating numerous directional changes of the flowing fluid for reducing flow rate and dissipating pressure.

The flow impedance arrangement 180 is incorporated into a compact, cartridge-like assembly generally designated as 182 and including an inner wall 184, an intermediate wall 186 and an outer wall 188. The walls 184, 186 and 188 are of complementary, circular configuration (FIG. 5), are of generally equal length, and are in telescoped relation relative to one another.

Inner wall 184 defines and surrounds a central, reduced diameter inlet passage 190 communicating with the inlet 28. The main valve seat 106 is defined at the upper end (as viewed in the drawings) of the inner wall 184.

Concentric annular passages or chambers 192 and 194 are defined respectively between the inner and intermediate walls 184 and 186 and between the intermediate and outer walls 186 and 188. An upper end wall 196 incorporates the valving surface 108 and the triangular ports 124, and blocks one end of the outer annular chamber 194. An opposite or lower end wall 198 blocks the opposite ends of both annular chambers 192 and 194.

The cartridge assembly 182, including its various walls and chambers, could be formed as a separate assembly or incorporated into the fill valve 20 in any desired way. In the illustrated arrangement, the inner wall 184 and the end wall 198 are parts of an insert member 200 having a collar 202 received in an enlarged diameter portion 204 of the inlet 28. The intermediate wall 186 and the end wall 196 are part of a diffuser element 206 inserted into the body 40 after mounting of the insert 200. The outer wall 188 is an integral portion of the body 40.

When the valve assembly 32 is in the open condition and the main valve member 104 is spaced from the seat 106, fluid flows axially relative to the cartridge assembly 182 along the central inlet passage 190. As the fluid passes the valve seat 106, it changes direction and moves radially outwardly in all directions across the valving surface 108. In order to flow through the triangular ports 124, the fluid again changes direction and flows in the opposite axial direction into ports 124 and through wall 196 where it enters the annular chamber 192 and is distributed around its entire periphery.

Flow in the radially outward direction from the inner annular chamber 192 into the outer annular chamber 194 is accommodated by a port 208 (FIG. 5) provided in the intermediate wall 186. Consequently, all of the fluid entering around the periphery of chamber 192 moves toward and through the port 208. As best appears in FIG. 5, the port 208 is located at a point in the wall 186 diametrically opposite from the fill valve outlet 30.

In order to reach the region of the outlet 30, the fluid entering the annular chamber 194 is subdivided into two equal components flowing initially in opposite directions between the intermediate and outer walls 186 and 188. Diametrically opposed to the port 208 in the wall 186 there is provided a port 210 in the wall 188 in communication with the outlet ports 168 and 170. Flow is reunited at the port 210.

The annular chamber 194 includes two semicircular, similar, parallel flow path segments defined between the intermediate and outer walls 186 and 188 and each extending from the port 208 to the port 210. These flow path segments 212 and 214 are further defined by the end walls 196 and 198 which block the ends of the annular chamber 194.

This arrangement of two semicircular flow path segments provides a compact configuration wherein the flow impedance arrangement 180 of the present invention is found. A number of inner baffles 216 extend radially outward from the intermediate wall 186 at regularly spaced intervals. A number of outer buffles 218 extend radially inwardly from the outer wall 188 and are interspersed between the inner baffles 216. Each of the baffles 216 and 218 extends across more than half of the radial distance between the interfacing walls 186 and 188.

Liquid flowing in each of the semicircular segments 212 and 214 is caused by the baffles 216 and 218 to make a large number of substantially right angle turns. Each of the many right angle turns results in loss of energy in the flowing liquid. Consequently, the effect of numerously repeated right angle turns is to regulate the flow velocity through the fill valve 20 to a desired value while dissipating inlet pressure. The changes in direction in other regions along the flow path, for example those occurring at the inlet passage 190, the valving surface 108, the ports 124, the chamber 192, and the port 208, have a similar effect.

The body 20 is provided with an outlet section 220 incorporating the outlet ports 168 and 170 and providing further right angle turns to which the fluid flow is subjected. Within the outlet section 220, there is provided a baffle structure 22 subdividing the flow from the port 210 into separate flows through the ports 168 and 170 and requiring additional right angle turns to be experienced by the flowing liquid.

It is important to note that at no point in the flow path is the liquid required to flow through an orifice or restriction or other region of greatly reduced cross-sectional area. As a result, localized velocity increases are not encountered, and flow rate is controlled and pressure is dissipated without the problems of cavitation and noise.

A refill component is extracted from flow through the fill valve 20 and may be used to refill the bowl of a toilet with which the fill valve 20 is used. Cover 42 is provided with a nipple 226 to which a refill tube may be connected. The underside of the cover 42 includes a refill passage 228 (FIGS. 4 and 9) extending to the nipple 226 from a region between the port 210 and the baffle structure 222.

As liquid flows through the fill valve 20, impurities, contaminants, sediments and particulate matter may interfere with its operation. Because no small area restrictions or orifices are found in the flow path of the fill valve, this problem is minimized in the illustrated arrangement. Nevertheless, it is desirable that the fill valve 20 be capable of convenient disassembly for repair or replacement of parts.

In accordance with a feature of the invention, the fill valve 20 can be disassembled without disturbing the mounting of the valve in the tank wall 24 and without disturbing the position of the adjusting screw 148 and thus the setting of the predetermined liquid level. This is accomplished through the provision of a releasable hinge structure 234 and a pair of fasteners 236 securing the cover 42 against the body 40.

More specifically, in the region of the outlet section 220, the body includes a raised portion defining a pair of slots 238 adjacent the outlet ports 168. The cover includes an aligned pair of tabs 240 which when inserted into the slots 238 provide a pivotal interconnection of the cover 42 to the body 40. When the cover 42 is pivoted down into contact with the body, a pair of projections 242 on the body are received in bosses 244 on the cover assuring that the cover and body are properly aligned. The fasteners 236, which may be self-tapping screws, are inserted from above the fill valve housing 22 through the bosses 244 into the projections 242.

This arrangement of interconnecting the body and cover has important advantages. One advantage is that the region of the valve assembly 32 is firmly clamped together with a triangular, three point system including the releasable hinge structure 234 and the two fasteners 236. In this manner, it is assured that fluid within the valve chamber 44 adjacent the main valve member 104 does not leak between the cover 42 and the body 40 and bypass the flow impedance arrangement 180. Reliable sealing of this region is provided by a gasket-like rim portion 246 of the main valve member 104.

The cover 42 can be removed from the body 40 without removing the body 40 from the opening 50 and tank wall 24. When the fasteners 236 are removed, the cover need be simply pivoted upwardly to release the tabs 240 from the slots 238. Since the fasteners 236 are inserted from above rather than from below the fill valve 20, they are accessible from within the tank without removal of the fill valve 20.

The adjusting screw 148 is attached to the fill valve 20 solely by its engagement with the thread 154 in the opening 150. If the screw 148 is threaded inwardly as illustrated in the drawings to the region of the body 40, the tip portion of the screw is received within the clearance provided by a circular wall 248 associated with the baffle structure 222. The screw 148 extends through but does not functionally obstruct the inlet portion of the refill passage 228.

When the housing 22 is disassembled by removal of the cover 42 from the body 40, the diaphragm 34 is lifted from the diaphragm chamber 46 by the lever 38. The entire control assembly 36, lever 38 and diaphragm 34 remains assembled so that reassembly and readjustment thereof is not required. Moreover, when the cover 42 is removed those portions of the fill valve 20 which might require cleaning or replacement are readily accessible. These portions include the diaphragm 34, the insert member 200, the diffuser 206 and the main valve member 104. In addition, access may readily be had to the region of the backflow preventer described hereinafter.

In accordance with one important feature of the present invention, a backflow preventer generally designated by the reference numeral 260 is associated with the fill valve 20. Flow through the fill valve from the interior of the tank to the inlet 28 is prevented by the structure and operation of the fill valve. However, in some instances it may be desirable positively to prevent any possibility of backflow through the provision of an additional backflow preventer or antisiphon device.

In general, the backflow preventer 260 in accordance with the present invention comprises a modular unit of compact, waferlike configuration received in the enlarged diameter portion 204 of the inlet passage 28 between a lower shoulder 262 and an upper shoulder 264 provided by the collar 202 of the insert member 200. Because of its modular construction and convenient size, the backflow preventer 260 may be used in connection with a wide variety of fixtures and devices wherein it can be mounted in a passage between interfacing shoulders or equivalent structure.

The backflow preventer 260 includes only three components: an upstream disc member 266, an elastomeric body 268, and a concavo-convex cup member 270. Each of these components is capable of being inexpensively manfuactured, and the cost of the backflow preventer 260 is minimal.

The upstream disc member 266 may be fabricated of any desired material such as a sheet metal, and in the illustrated arrangement is circular to fit within the passage 204. An annular array of upstream flow ports 272 is provided in the disc member 266. If desired, the ports 272 may be of a selected small size in order to strain out particles present in the liquid flowing through the backflow preventer 260.

The elastomeric body 268 is preferably a molded part formed of rubber or other flexible material. An outer ring or rim portion 274 is snugly received in sealing relation against the wall of the passage 204. A pair of sealing beads 276 are provided on the rim 274, and the shoulder 264 clamps the rim 274 and the disc member 266 against the shoulder 264.

The elastomeric body 268 further includes spaced apart upstream and downstream check members 278 and 280 extending radially inwardly from the rim portion 274. The upstream check 278 overlies the circular array of ports 272 and engages the downstream face of the disc member 266. A central opening 282 in the check 278 is bounded by a lip 284 providing a fluid tight seal when the downstream side of the check 278 is pressurized. When the upstream side is pressurized, the check 278 is resiliently deflected in the downstream direction to uncover and permit flow through the ports 272.

Cup member 270 is received between the checks 278 and 280, and includes an outer circular rim portion 286 in engagement with the inner wall of the rim 274 of the elastomeric body 268. The rim 286 engages the ring 274 between the beads 276 and is sized so that it presses the ring 274 radially outwardly to effect a liquid tight seal of the beads 276 against the wall of the passage 204.

The convex side of the cup member 270 is directed downstream to support the downstream check 280 and to provide a space or region between the two checks 278 and 280. A circular array of ports 290 is provided in the cup member 270, and the check 280 overlies these ports. When the downstream side of the check 280 is pressurized, it is biased against the cup member 270 to prevent flow through the ports 290. When the upstream side of the check 280 is pressurized, it is resiliently deflected away from the ports 290 and fluid flows through these ports and through a central opening 292 in the check 280.

Formed sheet metal or any other suitable material is used to fabricated the cup member 270. The ports 290 are formed by stamping or otherwise removing material from the body of the cup member. This material may be entirely severed, or as in the illustrated arrangement may be deflected in the upstream direction to form a number of projections 294 extending toward the upstream check 278. These projections prevent the upstream check from moving downstream and sealing against the cup member 270 thereby blocking the downstream ports 290. In the illustrated arrangement, alternate ones of the ports 290 are associated with one of the projections 294. This provides ample space between adjacent projections for the flow of liquid between the upstream ports 272 and the downstream ports 290.

Having reference now to FIGS. 12 and 13, there is illustrated a fill valve 300 comprising an alternative embodiment of the present invention. In most respects, the fill valve 300 is similar to the fill valve 20 described above in connection with FIGS. 1-11. Consequently, the same reference numerals are employed for similar parts, and the detailed description thereof is not repeated.

The fill valve 300 is not provided with a backflow preventer 260. Consequently, its structure is modified in some respects to achieve equivalent performance and to reduce costs. As can be seen in FIG. 12, the inner wall 184 and the end wall 198 of the cartridge assembly 182 are formed integrally with the body 40 rather than as a part of an insert member. The diameter of the inlet passage 28 is uniform throughout its length.

It is desirable that the fill valve 300 be characterized by the same flow rate as the fill valve 20. Since the flow restriction provided by the backflow preventer 260 is not present in the fill valve 300, the flow impedance arrangement 180 is augmented (FIG. 13) by an additional pair of baffles 302. These baffles 302 are adjacent the port 210 and require fluid flowing in the semicircular flow path segments 212 and 214 to execute additional right angle turns before leaving the port 210 and impinging upon the baffle structure 222.

While the invention has been described with reference to details of the illustrated embodiments, such details are not intended to limit the scope of the invention as defined in the following claims.

What is claimed and desired to be secured by Letters Patent of the United States is:

1. A valve assembly comprising inner, intermediate and outer telescoped cylindrical walls, means providing fluid communication with the region within said inner wall, means including a valve member engageable with one end of said inner wall for controlling fluid flow between the interior of said inner wall and the region between said inner and intermediate walls; an aperture in said intermediate wall permitting flow between said region and the space between said intermediate and outer walls, a passage permitting flow from said space to the exterior of said outer wall, said passage and said aperture being angularly spaced from one another along said space, a first plurality of baffles extending radially outward from said intermediate wall toward said outer wall, and a second plurality of baffles extending radially inward from said outer wall toward said intermediate wall, said first and second baffles being interspersed with one another between said aperture and said passage.

2. The valve assembly of claim 1, said passage and said aperture being diametrically opposed to define two paths for parallel flow in said space between said passage and aperture.

* * * * *